United States Patent Office 3,779,950
Patented Dec. 18, 1973

3,779,950
EPOXY RESIN COMPOSITIONS
Leo S. Kohn, Schenectady, and Robert W. Smearing, Ballston Lake, N.Y., assignors to General Electric Company
No Drawing. Filed Jan. 3, 1972, Ser. No. 215,107
Int. Cl. C08g 30/10, 30/14
U.S. Cl. 260—2 EC    9 Claims

ABSTRACT OF THE DISCLOSURE

The shelf life of epoxy resin compositions useful for adhesives, varnishes, injection molding and the like and containing phenolic cure accelerator is increased by blocking all or part of the hydroxyl groups of the cure accelerator with aromatic monoisocyanate.

This invention relates to epoxy resin compositions which are useful as adhesives, varnishes, coating purposes and injection molding purposes and the like. More particularly, the invention relates to epoxy resin compositions containing phenolic cure accelerator, the shelf lives of which are substantially increased by blocking all or a part of the hydroxyl groups of the phenolic cure accelerator with aromatic isocyanate.

The use of phenolic cure accelerators with epoxy resin compositions is well known. However, such compositions are generally characterized by an inordinately short shelf life and it is a primary object of this invention to provide epoxy resin compositions employing such phenolic cure accelerators which are possessed of a substantially increased shelf life, but with only a minimal increase in the gel time.

The epoxy resin employed in the thermosetting resin in this invention can be any epoxy resin having 1,2 epoxy groups or mixtures of such resins as indicated, and includes cycloaliphatic epoxy resins, such as 3,4-epoxycyclohexylmethyl-(3,4-epoxy)cyclohexane carboxylate (sold under the trademark ERL 4221 by Union Carbide Plastics Company, or Araldite CY 179 by Ciba Products Company), bis(3,4-epoxy-6-methylcyclohexylmethyl) adipate (sold under the trademark ERL 4289 by Union Carbide Plastics Company or Araldite CY178 by Ciba Products Company), vinylcyclohexene dioxide (ERL 4206 made by Union Carbide Plastics Company), bis(2,3-epoxycyclopentyl)ether resins (sold under the trademark ERL 4205 by Union Carbide Plastics Company), 2-(3,4-epoxy)cyclohexyl - 5,5 - spiro(3,4-epoxy)-cyclohexane-m-dioxane (sold under the trademark Araldite CY 175 by Ciba Products Company), glycidyl ethers of polyphenols epoxy resins, such as liquid or solid bisphenol-A diglycidyl ether epoxy resins (such as those sold under trademarks as Epon 826, Epon 828, Epon 830, Epon 1001, Epon 1002, Epon 1004, etc. by Shell Chemical Company), phenol-formaldehyde novolac polyglycidyl ether epoxy resins (such as those sold under the trademarks DEN 431, DEN 438, and DEN 439 by Dow Chemical Company), epoxy cresol novolacs (such as those sold under the trademarks ECN 1235, ECN 1273, ECN 1280 and ECN 1299 by Ciba Products Company), resorcinol glycidyl ether (such as ERE 1359 made by Ciba Products Company), tetraglycidoxy tetraphenylethane (Epon 1031 made by Shell Chemical Company), glycidyl ester epoxy resins such as diglycidyl phthalate (ED–5661 by Celanese Resins Company), diglycidyl tetrahydrophthalate (Araldite CY 182 by Ciba Products Company) and diglycidyl hexahydrophthalate (Araldite CY 183 made by Ciba Products Company or ED–5662 made by Celanese Resins Company), and flame retardant epoxy resins such as halogen containing bisphenol-A diglycidyl ether epoxy resins (e.g., DER 542 and DER 511 which have bromine contents of 44–48 and 18–20 percent, respectively, and are made by Dow Chemical Company).

The foregoing epoxy resins are well known in the art and are set forth, for example, in many patents including U.S. Pats. 2,324,483; 2,444,333; 2,494,295; 2,500,600; and 2,511,913. Moreover, it often is advantageous to employ mixtures of these epoxy resins, e.g., a glycidyl ether epoxy resin such as Epon 828 with a cycloaliphatic epoxy resin such as ERL 4221, to control the cure rate of the thermosetting resin. The hardeners of this invention are not only effective with various epoxy resins and mixtures of epoxy resins, but they are also effective in mixtures containing reactive and non-reactive epoxy diluents (or extenders), epoxy flexibilizers and fillers.

The hardener for the epoxy resin generally consists of a mixture of an organic titanate and a phenolic accelerator wherein the phenolic accelerator is present in quantities less than 15 percent by weight of the epoxy resin. Among the phenolic accelerators which can be effectively used in this invention are bisphenol-A [i.e., 2,2-bis(4-hydroxyphenyl) propane], pyrogallol, dihydroxydiphenyls as well as ortho-, meta-, and para-hydroxybenzaldehydes (such as salicylaldehyde), catechol, resorcinol, hydroquinone, and phenol-formaldehyde and resorcinol-formaldehyde condensates, Other phenolic accelerators suitably employed for the resin impregnant include halogenated phenols such as ortho-, meta-, and parachlorophenols or bromo-phenols, and ortho-, meta-, and para-nitrophenols. Desirably, the phenolic accelerator is present in concentrations between 0.1 and 15 percent by weight of the peoxy resin with optimum cure rates being produced with phenolic accelerator concentrations between 0.5 and 10 percent by weight of the epoxy resin. In general, the cure rate of the epoxy resin can be altered by varying the weight percentage of phenolic accelerator employed with the epoxy resin or by an alteration in the phenolic accelerator-epoxy resin combination. For example, the cure rate of ERL 4221-titanate-bisphenol-A solutions can be significantly increased by substituting a phenol-formaldehyde novolac accelerator for the bisphenol-A accelerator. Similarly, by substituting the phenol-formaldehyde novolac in the ERL 4221-titanate-novolac solution with catechol, the rate of cure can again be markedly increased. Within eeach epoxy-titanate-phenolic combination, the cure rate generally can be increased by increasing the relative phenolic content. By substituting the cycloaliphatic epoxy resin ERL 4221 with a diglycidyl ether epoxy resin such as Epon 828, the cure rate is decreased. Although the cure rate can be varied over a very wide range, the cured resins are tough solids with excellent electrical insulating properties.

The organic titanate added to the epoxy resin to assist the phenolic accelerator in controllably hardening the epoxy resin preferably is a chelated titanate or titanium alcoholate such as acetylacetonate titanate, lactate titanate, triethanolamine titanate, polyhydroxystearate titanate, a glycolate titanate (e.g., tetraoctylene glycol titanate containing approximately 7.8 percent Ti and sold under the trademark Tyzor OG by E. I. du Pont de Nemours and Company, or di-n-butyl hexylene glycol titanate), or a chelate stabilized with a nitrogen containing polymer (e.g., Tyzor WR sold by E. I. du Pont de Nemours & Company). By use of chelated titanates, the thermosetting resin can be employed in areas having a substantial water content in the ambient atmosphere. When the thermosetting resin is applied in an atmosphere having substantially zero humidity, non-chelated titanates such as tetraisopropyl titanate, tetrabutyl titanate, polymerized tetrabutyl titantate and tetrakis (2-ethylhexyl) titanate also can be employed for the epoxy resin hardener. Chelated titanates, such as acetylacetonate titanate, tetraoctylene glycol titanate and di-n-butyl hexylene glycol titanate, however, are preferred for the epoxy resin hardener to provide a homogeneous mixture while exhibiting resistance to hydrolyzation under humid conditions. In general, the chosen titanate should be present in the mixture in a concentration between 0.05 and 10 percent by weight of the epoxy resin with optimum cure rates generally being obtained utilizing titanate concentrations between 0.2 and 5 percent by weight of the epoxy resin.

The resin, phenolic accelerator and titanate chosen for the thermosetting resin can be mixed in any conventional fashion. A liquid phenolic can be dissolved in the epoxy resin or in the titanate either at room temperatures or at elevated temperatures. A solid phenolic accelerator in powdered form also can be dissolved in the epoxy resin at room temperature by continuous agitation prior to mixing with the chosen titanate or a liquid concentrate can be formed by dissolving the powdered phenol in part of the epoxy resin at temperatures between 150 and 160° C. whereafter the liquid solution is mixed with the remainder of the epoxy resin. Alternately, the solid phenolic accelerator can be dissolved in the titanate at temperatures of 100–160° C. whereupon the phenolic accelerator/titanate mixture is added to the epoxy resin to effect hardening.

It has been found that the shelf life of epoxy resin compositions utilizing phenolic cure accelerators can be substantially increased by blocking all or some of the hydroxyl groups on the accelerator.

Those features of the invention which are believed to be novel are set forth with particularity in the claims appended hereto. The invention will, however, be better understood and further objects and advantages appreciated from a consideration of the following description.

The following examples illustrate the practice of the present invention, it being understood that they are exemplary only and are not to be taken as limiting in any way. All parts and percents are by weight unless otherwise indicated.

EXAMPLE 1

There was prepared an epoxy resin composition consisting of 97 parts ERL 4221, two parts Tyzor OG and one part of bisphenol-A. There was added to this composition as a phenolic cure accelerator 1 percent based on the composition weight of nitrosalicylaldehyde. The gel time of this composition at 160° C. was three minutes and the shelf life at room temperature was about four weeks. Nitrosalicylaldehyde was blocked with phenyl monoisocyanate and added in various proportions to the basic epoxy resin composition of 97 parts ERL 4221, two parts Tyzor OG and one part bisphenol-A. When, for example, 1.7 percent of the blocked material was added to the basic composition, the shelf life was at least eight weeks and the gel time at 171° C. was 4.5 minutes. At 160° C. the gel time was 5.6 minutes and at 150° C. the gel time was 7.4 minutes. When one percent of the blocked cure accelerator was used, the gel time was 11.5 minutes and at a concentration of block cure accelerator of 0.5 percent, the gel time was 23 minutes. It will be seen that the blocked material has a much longer shelf life without sacrificing the short gel time. This material is particularly useful as a coating and impregnating material.

EXAMPLE 2

Example 1 was repeated using, first, resorcinol in the amount of 1 percent based on the weight of the base epoxy resin composition. The shelf life of this material was about two months and the gel time at 160° C. was 30 minutes. When one of the hydroxyl groups of the resorcinol molecule was blocked with phenyl monoisocyanate, the shelf life was over two months and the gel time at 150° C. was 31.6 minutes. Further, when both of the hydroxyl groups on the resorcinol were blocked with phenyl monoisocyanate and added in the amount of 1.5 percent to the base epoxy resin composition, the gel time at 150° C. was 69.5 minutes and the shelf life greater than two months.

EXAMPLE 3

Example 1 was repeated using catechol in the amount of 1 percent with the base epoxy resin composition, the gel time at 150° C. being less than one minute and the shelf life essentially zero. Then a monoblocked catechol was used in the amount of 1 percent using phenyl monoisocyanate as the blocking material, the gel time at 150° C. was 2.0 minutes and the shelf life substantially greater, or one week. When the catechol was diblocked with phenyl monoisocyanate and used in the amount of one percent with the base epoxy resin composition, the gel time at 150° C. was only 3.6 minutes and the shelf life at least six weeks.

It will be seen from the above examples that the shelf life or working life of the above epoxy resin compositions is substantially increased without significant increase in the gel time at elevated temperatures by the practice of this invention.

EXAMPLE 4

There was prepared a two-part epoxy resin composition, part A containing 92 parts ERL 4221 and eight parts of a 6 to 7 functionality phenol novolac cure accelerator known as BRW 5651 made by Union Carbide; part B consisting of 96 parts ERL 4221 and four parts Tyzor OG. When the two-part epoxy resin composition was combined along with two parts of nitrosalicylaldehyde, the shelf life of the resulting material was two days and the gel time at 150° C. was 2.5 minutes. When the nitrosalicylaldehyde was blocked with phenol monoisocyanate and used as above, the shelf life of the resulting material was one week and the gel time at 150° C. was 4.5 minutes. This material is particularly useful as an adhesive.

EXAMPLE 5

Example 4 was repeated using two parts of resorcinol as the catalyst. The shelf life of the material was less than eight days and the gel time at 150° C. was 4.3 minutes. When monoblocked resorcinol was used employing phenyl monoisocyanate as the blocking material, the shelf life was less than eight days but the gel time at 150° C. was 5.3 minutes. When diblocked or totally blocked resorcinol was used, the gel time at 150° C. was 6.9 minutes and the shelf life had increased to two weeks.

EXAMPLE 6

Example 4 was repeated using catechol as the two-part catalyst, the gel time at 150° C. being less than one minute and the shelf life zero. This material was used to adhere together two steel sheets about one inch by three and one-half inches, the sample being cured for about thirty-five minutes at 150° C. The lap shear strength of the bond was 960 p.s.i. When the catechol was monoblocked with phenyl monoisocyanate, the gel time at 150° C. was about two minutes and the shelf life almost five days. When this material was used to bond steel sheets together as above, the lap shear strength was 730 p.s.i. However, when the catechol was diblocked with the phenyl monoisocyanate, the gel time at 150° C. was 4.5 minutes and the shelf life was substantially increased to two weeks. The lap shear strength of this material when used as above was 860 p.s.i. It will be seen that by the present treatment, good adhesive qualities and much improved shelf life are obtained.

The present materials are useful as adhesives for bonding together similar or dissimilar materials including but not limited to wood, glass, metals, mica, micaceous material, and the like. They are also used as coating compositions and liquid injection molding materials.

What we claim as new and desire to secure by Letters Patent of the United States is:

1. An epoxy resin composition comprising epoxy resin containing 1,2 epoxy groups, chelated titanium alcoholate, first phenolic cure accelerator and second phenolic cure accelerator, said second phenolic cure accelerator having at least part of its hydroxyl groups blocked with aromatic monoisocyanate.

2. A resinous composition as in claim 1 in which said epoxy resin comprises 3,4-epoxycyclohexylmethyl-(3,4-epoxy)cyclohexane carboxylate.

3. A resin composition as in claim 1 in which said monoisocyanate is phenyl monoisocyanate.

4. A resin composition as in claim 1 in which said chelated titanate is tetraoctylene glycol titanate.

5. A resin composition as in claim 1 in which said phenolic accelerator constitutes from about 0.1 to 15 percent by weight based on the epoxy resin.

6. A resin composition as in claim 1 in which said chelated titanate constitutes between about 0.05 percent and 10 percent by weight of the epoxy resin.

7. The process of lengthening the shelf life of an epoxy resin composition comprising an epoxy resin having 1,2 epoxy groups, chelated titanium alcoholate, first phenolic cure accelerator and second phenolic cure accelerator which comprises blocking at least some of the hydroxyl groups of said second phenolic cure accelerator with aromatic monoisocyanate.

References Cited
UNITED STATES PATENTS

| | | | |
|---|---|---|---|
| 3,012,007 | 12/1961 | Caflisch et al. | 260—47 |
| 3,379,654 | 4/1968 | Seiz | 260—2 |
| 3,505,283 | 4/1970 | Dalhuisen | 260—47 |
| 3,505,284 | 4/1970 | Dalhuisen | 260—47 |
| 3,637,902 | 1/1972 | Dukes et al. | 260—830 TW |
| 3,649,572 | 3/1972 | Hairston et al. | 260—2.5 EP |

WILLIAM H. SHORT, Primary Examiner

E. A. NIELSEN, Assistant Examiner

U.S. Cl. X.R.

260—47 EC, 53 EP, 57 R